United States Patent
Brener et al.

(10) Patent No.: US 9,018,642 B1
(45) Date of Patent: Apr. 28, 2015

(54) MID-INFRARED TUNABLE METAMATERIALS

(71) Applicant: Sandia Corporation, Albuquerque, NM (US)

(72) Inventors: Igal Brener, Albuquerque, NM (US); Xiaoyu Miao, Sunnyvale, CA (US); Eric A. Shaner, Rio Rancho, NM (US); Brandon Scott Passmore, Fayetteville, AR (US); Young Chul Jun, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 102 days.

(21) Appl. No.: 13/716,324

(22) Filed: Dec. 17, 2012

Related U.S. Application Data

(63) Continuation-in-part of application No. 12/965,659, filed on Dec. 10, 2010.

(60) Provisional application No. 61/286,560, filed on Dec. 15, 2009.

(51) Int. Cl.
*H01L 29/00* (2006.01)
*G02B 5/28* (2006.01)

(52) U.S. Cl.
CPC ........................................ *G02B 5/28* (2013.01)

(58) Field of Classification Search
CPC ....................................................... H01L 29/36
USPC ............................................ 257/1, 79, 1.79
See application file for complete search history.

(56) References Cited

PUBLICATIONS

Chen, Hou-Tong, "A metamaterial solid-state terahertz phase modulator," Nature Photonics, vol. 3, Mar. 2009.
Chen, Hou-Tong, "Active terahertz metamaterial devices" Nature Letters, vol. 444, 30, Nov. 2006, pp. 597-600.
Chen, Hou-Tong, "Active terahertz Metamaterials1" Optics and Spectroscopy, vol. 108, No. 6, (2010) pp. 834-840.
Dicken, "Frequency tunable near-infrared metamaterials based on VO2 phase transition" Optics Express, Sep. 28, 2009, vol. 17, No. 20, pp. 18332-18339.
Driscoll, T., "Dynamic tuning of an infrared hybrid-metamaterial resonance using vanadium dioxide" Applied Physics Letters, 93 (2008) pp. 124101-1 to 024101-3.
Driscoll, T., "Memory Metamaterials" Science, Sep. 18, 2009. vol. 325, No. 5947, pp. 1518-1521.
Ikonen, Pekka, M.T. , "Determination of Generalized Permeability Function and Field Energy Density in Artificial Magnetics Using the Equivalent-Circuit Method" IEEE Transactions on Microwave Theory and Techniques, vol. 55, No. 1, Jan. 2009, pp. 92-99.

(Continued)

*Primary Examiner* — Matthew Reames
(74) *Attorney, Agent, or Firm* — Martin I. Finston

(57) ABSTRACT

A mid-infrared tunable metamaterial comprises an array of resonators on a semiconductor substrate having a large dependence of dielectric function on carrier concentration and a semiconductor plasma resonance that lies below the operating range, such as indium antimonide. Voltage biasing of the substrate generates a resonance shift in the metamaterial response that is tunable over a broad operating range. The mid-infrared tunable metamaterials have the potential to become the building blocks of chip based active optical devices in mid-infrared ranges, which can be used for many applications, such as thermal imaging, remote sensing, and environmental monitoring.

8 Claims, 13 Drawing Sheets

(56) References Cited

PUBLICATIONS

Jun and Brenner, "Electrically tunable infrared metamaterials based on depletion-type semiconductor devices" J. Opt. 14 (2012) pp. 1-9.

Jun, Y.C. et al., "Electrically-Controlled Thermal Infrared Metamaterial Devices" CLEO Technical Digest (2012) pp. 1-2.

Jun, Y.C. et al., "Active tuning of mid-infrared metamaterials by electrical control of carrier densities" Optics Express, 20:2 (2012) pp. 1903-1911.

Jun, Young Chul, "Electrically-Driven Active Plasmonic Devices" INTECH (2012) pp. 383-400.

Linden, S., "Magnetic Response of Metamaterials at 100 Terahertz" Science, vol. 306, Nov. 19, 2004, pp. 1351-1353.

Litwin-Staszewska, "The Electron Mobility and Thermoelectric Power in Sb at Atmospheric and Hudrostatic Pressures" Phys. Stat. sol (b) 106, (1981) pp. 551-559.

Manzanares-Martinez, "Temperature Tuning of two-dimensional photonic crystals in the presence of phonons and a plasma of electrons and holes" Physical Review, B 72 (2005) pp. 035336-1 to 035336-9.

O'Hara, "Thin-film sensing with planar terahertz metamaterials: sensitivity and limitations" Optics Express, Feb. 4, 2008, vol. 16, No. 3, pp. 1786-1795.

Passmore, "Mid-Infrared doping tunable transmission through subwavelength metal hold arrays on InSb" Optics Express, Jun. 8, 2009, vol. 17, No. 12, pp. 10223-10230.

Shelton, "Effect of thin silicon dioxide layers on resonant frequency in infrared metamaterials" Optics Express, Jan. 18, 2010, vol. 18, No. 2, pp. 1085-1090.

Werner, D.H., "Liquid crystal clad near-infrared metamaterials with tunable negative-zero-positive refractive indices" Optics Express, Mar. 19, 2007, vol. 15, No. 6, pp. 3342-3347.

Valentine, J. et al., "An optical cloak made of dielectrics" Nature Materials, vol. 8, Jul. 2009, pp. 568-571.

Zhang and Liu, "Superlenses to overcome the diffraction limit" Nature Materials, vol. 7, Jun. 2008, pp. 435-441.

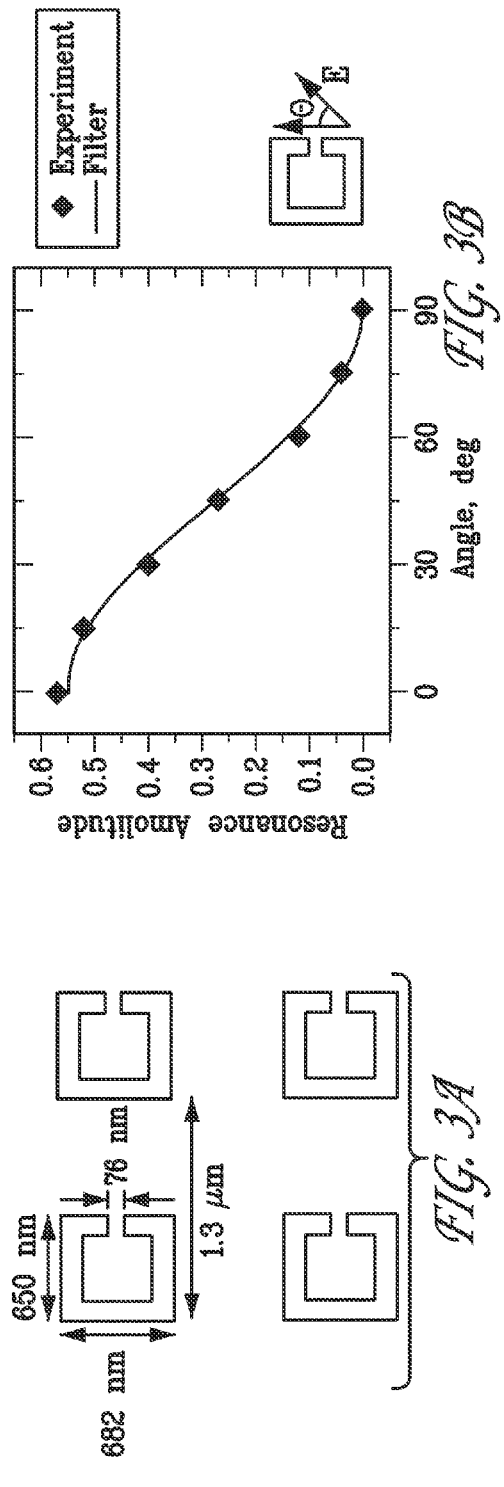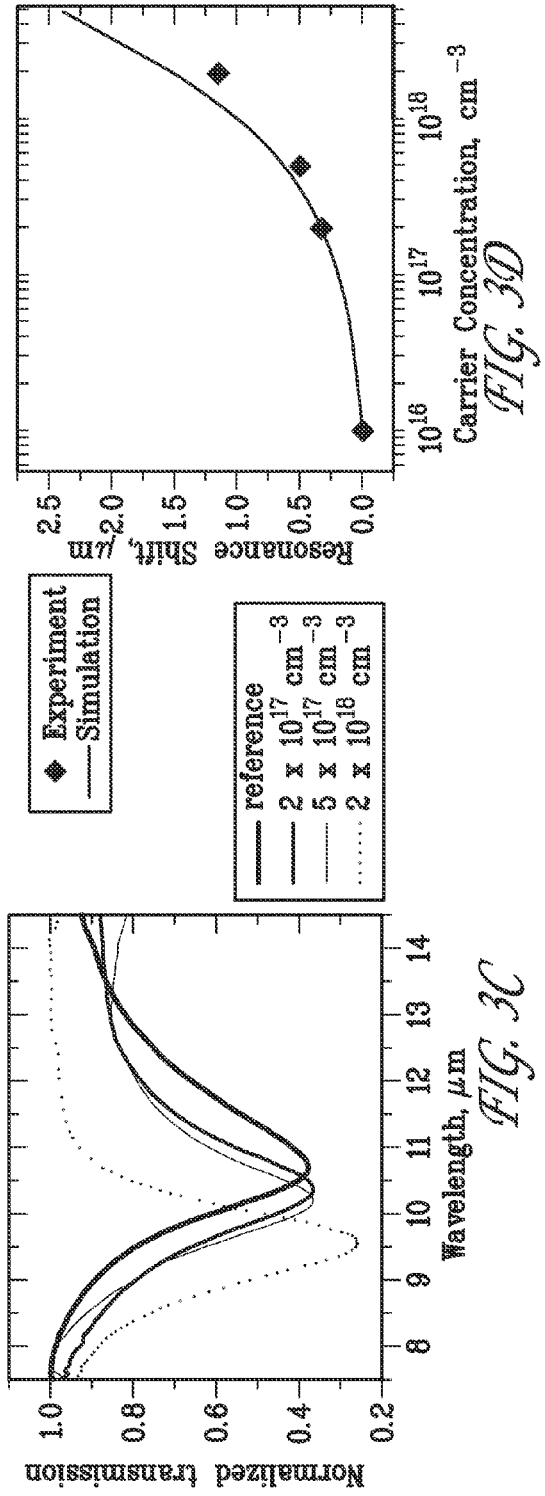
FIG. 3A
FIG. 3B
FIG. 3C
FIG. 3D

MID-INFRARED TUNABLE METAMATERIALS

CROSS-REFERENCE TO RELATED APPLICATION

This application claims the benefit of U.S. Provisional Application No. 61/286,560, filed Dec. 15, 2009, which is incorporated herein by reference.

This application is a continuation-in-part of U.S. patent application Ser. No. 12/965,659, filed Dec. 10, 2010, the benefit of which is hereby claimed and which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to electromagnetic metamaterials and, in particular, to metamaterials that are tunable in the mid-infrared portion of the electromagnetic spectrum.

BACKGROUND OF THE INVENTION

The ability of metamaterials to create artificial electromagnetic properties absent in nature has initiated intense research efforts for applications in frequency selective surfaces, subdiffraction imaging, cloaking, and etc. See S. Linden et al., "Magnetic response of metamaterials at 100 terahertz," *Science* 306, 1351 (2004); X. Zhang, and Z. Liu, "Superlenses to overcome the diffraction limit," *Nature Materials* 7, 435 (2008); and J. Valentine et al., "An optical cloak made of dielectrics," *Nature Materials* 8, 568 (2009). The development of tunable metamaterials, which allow for real-time tuning of the electromagnetic response, is emerging as an important sub-topic in this field. Tunable metamaterials have the potential to become the building blocks of chip-based active optical devices, and as optical switches, modulators, and phase shifters. A typical way to make such tunable metamaterials is to integrate a natural reconfigurable material in the metamaterial structure and apply an external stimulus to achieve tuning. For example, tunable metamaterials have been demonstrated using electrical reorientation in liquid crystals and thermally/electrically induced insulator-to-metal phase transition in vanadium dioxide ($VO_2$). See D. H. Werner et al., "Liquid crystal clad near-infrared metamaterials with tunable negative-zero-positive refractive indices," *Optics Express* 15, 3342 (2007); M. J. Dicken et al., "Frequency tunable near-infrared metamaterials based on $VO_2$ phase transition," *Optics Express* 17, 18330 (2009); T. Driscoll et al., "Dynamic tuning of an infrared hybrid-metamaterial resonance using vanadium dioxide," *Applied Physics Letter* 93, 024101 (2008); and T. Driscoll et al., "Memory Metamaterials," *Science* 325, 1518 (2009).

Recently, active terahertz metamaterials based on variants of split-ring resonators (SRRs) on a doped gallium arsenide (GaAs) substrate have been realized by dynamically changing the carrier concentration of the underlying semiconductor using an electric bias voltage, which effectively tunes the strength of the resonance, producing an amplitude modulation effect or a phase modulation. This amplitude modulation is a result of "shunting" due to the presence of carriers in the doped substrate. See H.-T. Chen et al., "Active terahertz metamaterial devices," *Nature* 444, 597 (2006); H.-T. Chen et al., "A metamaterial solid-state terahertz phase modulator," *Nature Photonics* 3, 148 (2009); and U.S. Pat. No. 7,826,504 to Chen et al. However, all of these references disclose electrically tunable metamaterials at only terahertz frequencies (i.e., 0.1-3 THz).

Therefore, a need remains for a metamaterial that is tunable in a higher (e.g., infrared) spectral range.

SUMMARY OF THE INVENTION

The present invention is directed to a tunable metamaterial, comprising a doped semiconductor substrate having a large dependence of dielectric function on the carrier concentration and a semiconductor plasma resonance lying below an operating frequency range; an array of resonators on the doped semiconductor substrate; and an electrical circuit for applying a bias voltage between the doped semiconductor substrate and the resonator array for modulating the carrier concentration of the semiconductor substrate and tuning the resonance of the resonator array over the operating frequency range. In general, the resonator array can be tunable over a range of operating frequency range of 100 THz to 15 THz (wavelength range of 3-20 µm). For example, the semiconductor substrate comprises InSb, InAs, GaAs, GaSb, GaN, or Si that is doped n-type. In general, the resonator array can comprise a ring-like structure with one or multiple splits or a wire-like structure in a connected arrangement, such as a split-ring resonator, a cut-wire pair, or a fishnet-like structure, that is scalable through most of the short- to long-infrared. The metamaterial can further comprise a gate dielectric layer, such as $HfO_2$ or $SiO_2$, between the resonator array and the doped semiconductor substrate.

The mid-infrared tunable metamaterials have the potential to become the building blocks of chip based active optical devices in mid-infrared ranges, which can be used for many applications, such as thermal imaging, remote sensing, and environmental monitoring.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 3(a) is a scanning electron microscopic image of an array of SRRs fabricated on an InSb substrate. FIG. 3(b) is a graph of the resonance amplitude of the SRR array fabricated on the InSb substrate at the doping level at $5\times10^{17}$ cm$^{-3}$ versus the intersection angle between incident light polarization direction and the gap of the split-ring resonator. The dots are the experimental measured values. The curve is a fit proportional to $\cos^2 \theta$. FIG. 3(c) is the transmission spectra for the metamaterial with SRRs fabricated on the reference InSb wafer, and the other three doped substrates. The polarization direction of the incident light is parallel to the SRR gap. FIG. 3(d) is a graph of the resonance shift when the carrier concentration is increased from the intrinsic level. The curve shows the results from a finite element simulation. The dots are the experimentally measured values.

DETAILED DESCRIPTION

Figure 1A:
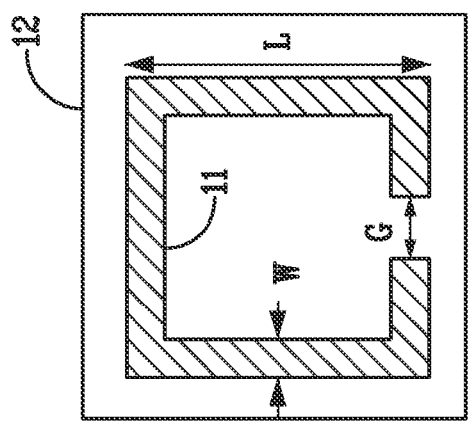
FIG. 1(a) is a top-view schematic illustration of a split-ring resonator (SRR) on a semiconductor substrate.
Figure 1B:
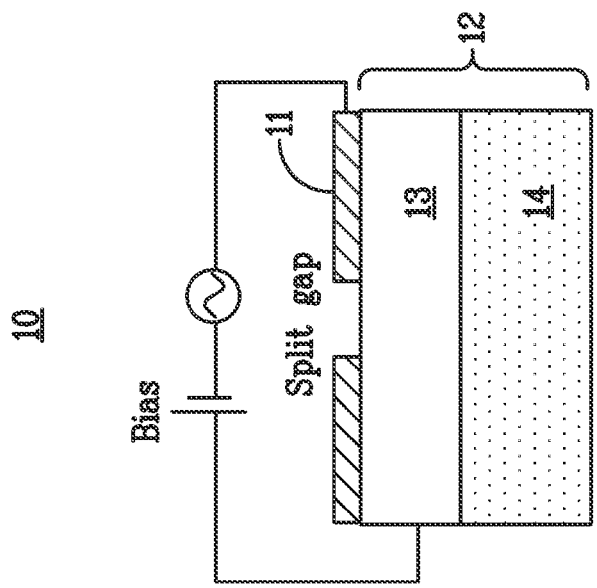
FIG. 1(b) is a side-view schematic illustration of the metamaterial. A voltage bias is applied between the metal resonator and doped semiconductor substrate to control the substrate carrier concentration.

FIG. 1(a) shows a top-view schematic illustration of an exemplary SRR 11 on a semiconductor substrate 12. FIG. 1(b) is a side-view schematic illustration of an electrically tunable metamaterial 10. A voltage bias is applied by an electrical circuit 15 between the metal resonator 11 and the doped semiconductor substrate 12 to control the substrate carrier concentration. The doped semiconductor substrate 12 can comprise a doped layer 13 grown on a semi-insulating substrate 14. The metamaterial can further comprise an additional symmetric resonator on the backside of the doped layer or semiconductor substrate. In general, the tunable metamaterial can comprise an array of such resonators on the frontside and/or backside of the doped layer or semiconductor substrate.

Figure 1C:
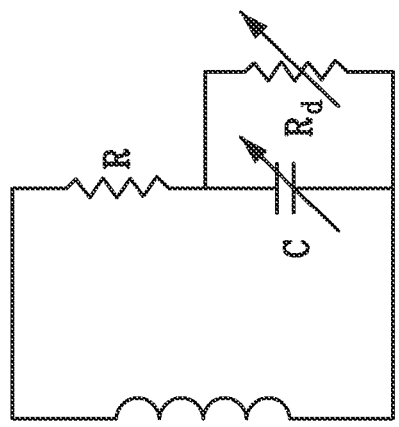
FIG. 1(c) is an equivalent circuit of the electrically tunable metamaterial.

As shown in FIG. 1(c), the resonance of a SRR on a semiconductor substrate can be explained by an equivalent circuit model, where the ring inductance is described by L, the split gap and fringing capacitance are denoted by C, the resistor R models the dissipation in the split rings, and the resistor $R_d$ models the dissipation due to the substrate free carrier absorption within the split gap (and in the regions in close proximity to the metal lines). See S. Linden et al., "Magnetic response of metamaterials at 100 terahertz," *Science* 306, 1351 (2004); and H.-T. Chen et al., "Active terahertz metamaterial devices," *Nature* 444, 597 (2006). When the metal lines act as gates, the underlying carrier concentration, in principle, can be changed by the application of an electrical bias affecting thus both $R_d$ and C. The resistance $R_d$ is inversely proportional to the AC conductivity of the doped semiconductor material due to free carrier losses. See P. Ikonen and S. Tretyakov, "Determination of generalized permeability function and field energy density in artificial magnetic using the equivalent-circuit method," *IEEE Transactions on Microwave Theory and Techniques* 55, 92 (2007). The capacitance C is related to the dielectric function of the semiconductor substrate due to the field lines fringing into the material. See L. I. Basilio et al., "Equivalent circuit models and optimization of a split-ring resonator," IEEE International Symposium on Antennas and Propagation and USNC-URSI National Radio Science Meeting (2009); and J. F. O'Hara et al., "Thin-film sensing with planar terahertz metamaterials: sensitivity and limitations," *Optics Express* 16, 1786 (2008). The resistance change in $R_d$ influences the resonance strength while the capacitance change in C shifts the resonance frequency.

For terahertz tunable metamaterials, it is critical to choose a semiconductor substrate with the same plasma frequency as the resonance frequency of metamaterial resonator. Therefore, in previous tunable metamaterial work with doped GaAs, the SRRs were designed to work at terahertz frequencies and the plasma frequency of the doped GaAs substrate matched this designed frequency, the resistance change of $R_d$ was the dominant mechanism that modified the resonance. See H.-T. Chen et al., "Active terahertz metamaterial devices," *Nature* 444, 597 (2006). Therefore, mainly an amplitude modulation of the resonance was observed, but a phase change was also possible.

For the mid-infrared tunable metamaterials of the present invention, the underlying semiconductor substrate preferably has a large dependence of dielectric function on the carrier concentration and the built-in semiconductor plasma resonance (set by material properties and carrier density) lies below the mid-infrared metamaterial operating range. The capacitance change (through a change in the real part of the dielectric function) becomes the dominant mechanism, resulting in a resonance shift instead of an amplitude modulation when the carrier concentration of the semiconductor substrate varies.

The resonance shift is determined by both the metamaterial geometry and the local dielectric environment. In the underlying semiconductor, the presence of free carriers can be described by the Drude model:

$$\varepsilon = \varepsilon_\infty \left[1 - \frac{\omega_p^2}{\omega^2 + i\omega\tau^{-1}}\right], \omega_p = \frac{4\pi Ne^2}{\varepsilon_x m^*}$$

where $\omega_p$ is the plasma frequency, N is the carrier concentration, $\varepsilon_\infty$ is the high frequency dielectric constant of the semiconductor, m* is the effective mass in the semiconductor, and τ is the scattering time. The model is based on treating electrons as damped harmonically bound particles subject to external electric fields. In general, any semiconductor that can achieve a plasma frequency near the desired metamaterial operating range with a damping constant on the order of the reciprocal operating frequency can be considered. The combination of low effective mass and high carrier concentration provides a high plasma frequency. The damping time in the semiconductor also impacts the amount of the effect that free carriers can have on the dielectric constant, where longer damping times lead to both greater tuning and lower losses. For operation near 10 μm wavelength, InSb-based semiconductors have a small electron effective mass and can produce useful effects with carrier concentrations on the order of $10^{18}$ $cm^{-3}$. However, the Drude formalism is universal such that the semiconductor can generally also comprise indium arsenide (InAs), gallium arsenide (GaAs), gallium antimonide (GaSb), and gallium nitride (GaN)-based compound semiconductors, as well as silicon-based semiconductors.

In order to provide a further tuning upon the application of a voltage, it is necessary to deplete this charged layer in an appropriate manner. Schottky contacts are difficult to implement at these doping levels and thus a metal-dielectric-semiconductor architecture can be used, very much like in an MOS transistor.

Various types of resonator elements can be used, including ring-like structures with one or multiple splits or wire-like structures in some connected arrangement, such as split-ring resonators (SRRs), cut-wire pairs (CWPs), or fishnet-like structures.

As an example of the present invention, InSb was used a substrate because it has a large dependence of dielectric function on doping levels, thereby enhancing this tuning effect through a change in the dielectric function of the substrate. This effect has been used previously for tunable subwavelength hole arrays, photonic crystals, etc. See B. S. Passmore et al., "Mid-infrared doping tunable transmission through subwavelength metal hole array on InSb," *Optics Express* 17, 10223 (2009); and W. Zawadski, "Electron transport phenomenon in small-gap semiconductors," *Advances in Physics* 23, 435 (1974). The exemplary mid-infrared tunable metamaterials were based on metallic split-ring resonators fabricated on doped InSb. Finite element simulations and measured transmission data showed that the resonance blue shifts when the semiconductor electron carrier concentration was increased while keeping the split ring geometry constant. A resonant wavelength shift of 1.15 μm was achieved by varying the carrier concentration of the underlying InSb epilayer from $1\times10^{16}$ $cm^{-3}$ to $2\times10^{18}$ $cm^{-3}$. Therefore, active tuning of metamaterials in the mid-infrared can be achieved using metallic metamaterial resonators fabricated on semiconductor substrates having a large dependence of dielectric function on carrier concentration (e.g., doped InSb).

Figure 2A:
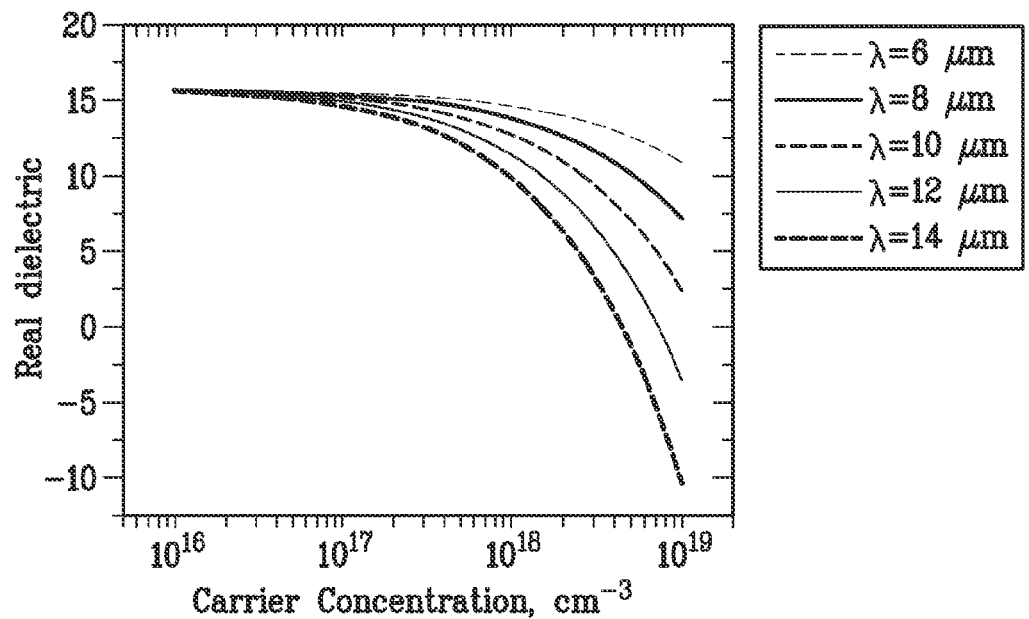
FIG. 2(a) is a graph of the real component of the complex dielectric function of indium antimonide (InSb) as a function of wavelength with different doping.

The real component of InSb's dielectric function at mid-infrared frequencies as a function of carrier concentration is displayed in FIG. 2(a). This was calculated from published data using the Drude model, which includes scattering and measured values for carrier concentration dependent mobility and effective mass. See J. Manzanares-Martinez et al., "Temperature tuning of two-dimensional photonic crystals in the presence of phonons and a plasma of electrons and holes," *Physical Review B* 72, 035336-1 (2005); and E. Litwin-Staszewska et al., "The electron mobility and thermoelectric power in InSb at atmosphere and hydrostatic pressures," *Physica Status Solidi (b)* 106, 551 (1981). As seen in this figure, the real part of InSb's dielectric function decreases as the carrier concentration increases and this trend becomes more significant at longer wavelengths. According to the LC circuit model, a decrease of the real component of the substrate's dielectric function will decrease the capacitance, and therefore shift the resonance to a higher frequency (i.e., a shorter wavelength).

A finite-element frequency domain solver was used to simulate the behavior of split-ring resonators on InSb substrates with varying carrier concentrations. The substrate comprised a 100-nm n-type doped layer grown on a semi-insulating InSb wafer. Gold SRRs were scaled from known designs such that the main resonance occurred at λ=10 μm (arm length of 660 nm, arm width of 130 nm, gap of 100 nm, and thickness of 80 nm). The computed wavelength dependent dielectric functions of InSb at different doping levels were used for the simulation. For the dielectric function of Au, a fitted Drude model based on ellipsometric data measured in the mid-infrared regime was used, with a plasma frequency of $1.27\times10^{16}$ rad/s and a collision frequency of 66 THz. A unit cell boundary condition was used to include the coupling effect between split-ring resonators, and the lattice constant between adjacent resonators was set as 1.34 μm.

Figure 2B:
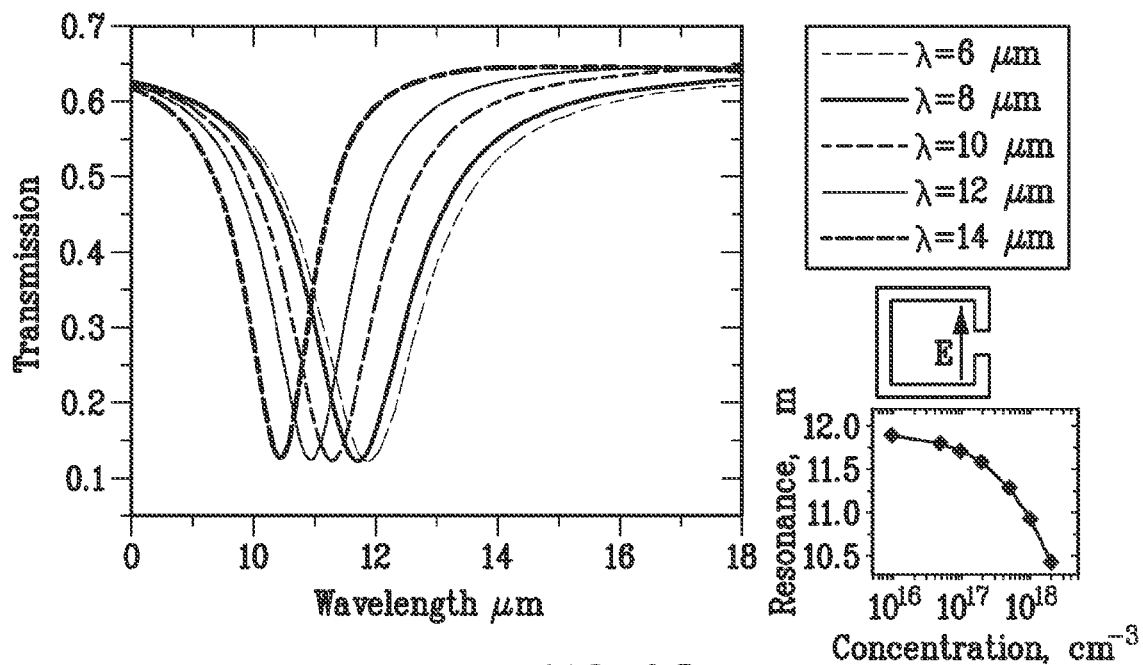
FIG. 2(b) is transmission spectra of SRRs on InSb substrates with different carrier concentration. The curves are the simulated transmission spectra of SRRs on an InSb substrate at carrier concentrations of $1\times10^{16}$ cm$^{-3}$, $1\times10^{17}$ cm$^{-3}$, $5\times10^{17}$ cm$^{-3}$, $1\times10^{18}$ cm$^{-3}$, and $2\times10^{18}$ cm$^{-3}$. The inset shows the resonance wavelength of metamaterial versus carrier concentration in the InSb substrate.

FIG. 2(b) shows the simulated transmission spectra of metamaterials at normal incidence when the polarization direction of the excitation light was parallel to the gap as shown in the inset and the carrier concentration of the doped InSb layer was varied. The simulated metamaterial resonances (displayed as transmission minima) occur in the mid-infrared range. More importantly, the resonances shift monotonically from 11.9 μm to 10.4 μm when the carrier concentration increases from $1\times10^{16}$ $cm^{-3}$ to $2\times10^{18}$ $cm^{-3}$ (inset of FIG. 2(b)) due to a change in the bias voltage. Such resonance shifts are due to the differences in the dielectric functions of substrates when the carrier concentration in the doped layer varies as discussed above. There is very little change in the Q-factor of these resonances as the doping is varied, indicating that there is little effect of resistance shunting as observed at THz frequencies. See H.-T. Chen et al., "Active terahertz metamaterial devices," *Nature* 444, 597 (2006). Another way to look at the resonance shift is to study the transmission change at a specific wavelength. When the doping is varied from $2\times10^{18}$ $cm^{-3}$ to $1\times10^{16}$ $cm^{3}$, the metamaterial transmission at 10.4 μm changes from 12% to 52%, which corresponds to a modulation depth of 62.5%. No resonance was observed in the simulated transmission spectra of metamaterials when the polarization direction of the excitation light was orthogonal to the gap, as expected.

For the experimental study, metamaterial samples were fabricated on four different InSb substrates. One of the substrates, a (111) lightly doped InSb wafer without the doped epilayer, was chosen as a reference. The other three substrates consisted of a thin n-type doped layer grown on the reference wafer by molecular beam epitaxy. The thicknesses of the doped layers in the three substrates were 150 nm, 150 nm, and 750 nm, respectively. The corresponding carrier concentrations of the doped layers were $2\times10^{17}$ $cm^{3}$, $5\times10^{17}$ $cm^{-3}$, and $2\times10^{18}$ $cm^{-3}$. The carrier concentrations were determined from doped InSb layers grown on SI—GaAs substrates by Hall measurements using the van der Pauw method at room temperature. The split-ring resonators were patterned on InSb substrates using standard nanofabrication techniques including electron-beam lithography, metal deposition, and lift-off. The metamaterial elements were patterned with a period of 1.34 μm to form a planar array of 2×2 $mm^2$. The sample was spin coated with polymethylmethacrylate and baked at 170 degree for 30 minutes. The split-ring structures were exposed using an electron beam lithography system operating at 100 kV and 1 nA beam current. The dose used for the small structures was around 1000 μC/$cm^2$. Electron beam evaporation was used to deposit 100 Å and 700 Å of Ti and Au, respectively. Lift-off was conducted in an acetone bath. A representative scanning electron microscope image of a split-ring resonator is shown in FIG. 3(a). To minimize the scattering from surface roughness during the transmission measurement, the backside of the samples was polished using a grinder-polisher.

Transmission spectra of the fabricated metamaterials were measured using a Fourier-transform infrared spectrometer. Samples were analyzed at room temperature using a liquid-nitrogen cooled mercury cadmium telluride detector. A spectral resolution of 1 cm$^{-1}$ was used and the data were averaged over 100 scans. An polarizer was placed in front of the sample so that polarization-dependent transmission could be recorded from θ=0 to 90 degrees in an increment of 15 degrees, where e is the intersection angle between incident light polarization direction and the gap of the split-ring resonator (i.e., θ=0 degree represents a polarization direction parallel to the gap; θ=90 degree represents a polarization direction orthogonal to the gap). FIG. 3(b) shows the amplitude of the resonance at different intersection angles (measured on the sample with a carrier concentration of 5×10$^{17}$ cm$^{-3}$) and reveals that the amplitude of the resonance varies as $\cos^2 \theta$, which represents the projection of the excited light intensity in the direction parallel to the gap. Such polarization dependence is consistent with the simulation results as discussed above and is indicative of excitation of the LC resonance of SRRs.

The position of the LC resonance is found to be strongly dependent on the carrier concentration of the semiconductor substrate. FIG. 3(c) shows the normalized transmission spectra of the four metamaterial samples used in this study. Each spectrum was taken with incident light polarization parallel to the gap. A clear blue shift of the transmission peak is seen as the doping level of the InSb substrate is increased. The experimentally observed trend of the metamaterial resonance as a function of substrate doping is consistent with both the LC circuit model analysis as well as the finite element simulation. This trend is plotted in FIG. 3(d) together with the simulation results. As shown, the experimentally observed shift is in very good agreement with the results from finite element simulations. The slight difference may be attributed to a number of factors, including the varying thickness of the doped layers and an uncertainty in the measured carrier concentrations.

Figure 4:
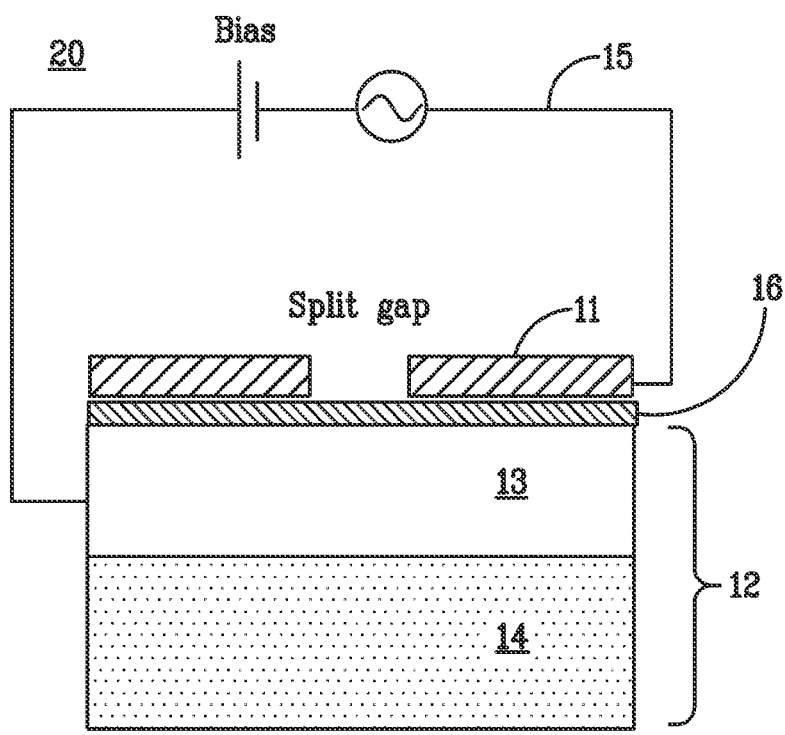
FIG. 4 is a side-view schematic illustration of an electrically tunable metamaterial that uses a gate dielectric.

As shown in FIG. 1, the carrier concentration can be modified by applying a voltage bias between a metallic Schottky gate connected to the array of resonator elements and an ohmic contact to the semiconductor substrate. A potential concern when using InSb as a substrate is the electron tunneling between gold SRRs and InSb substrate when a high doping level is used. Therefore, a metal-oxide-semiconductor (MOS) capacitor can be used as the gated device instead of the simple metal-semiconductor (Schottky) contact. FIG. 4 is a side-view schematic illustration of an electrically tunable metamaterial 20 that uses a gate dielectric 16 between the resonator 11 and the semiconductor substrate 12. In general, the thickness of the dielectric needs to be thin enough such that fields from the metamaterial resonator can still penetrate into the underlying semiconductor material. However, even when the gate dielectric is very thin, a very small absorption at the frequency of operation (i.e., where the metamaterials have their resonances) is effectively amplified by the Q of the metamaterial resonator. See D. J. Shelton et al., "Effect of thin silicon dioxide layers on the resonant frequency in infrared metamaterials," *Optics Express* 18 (2), 1085 (2010). This can have a significant degradation of the Q and thus the performance of such resonances. For example, in the thermal infrared, HfO$_2$ can be used as the gate dielectric, since its mid-infrared absorption is very low. For shorter infrared wavelengths, (e.g., less than 7 μm), SiO$_2$ can be used as the gate dielectric. Alternatively, heterostructures (AlInSb/InSb) can be used instead of InSb to achieve the gate isolation.

Metamaterial Layers on Gallium Arsenide Epilayers

Figure 5:
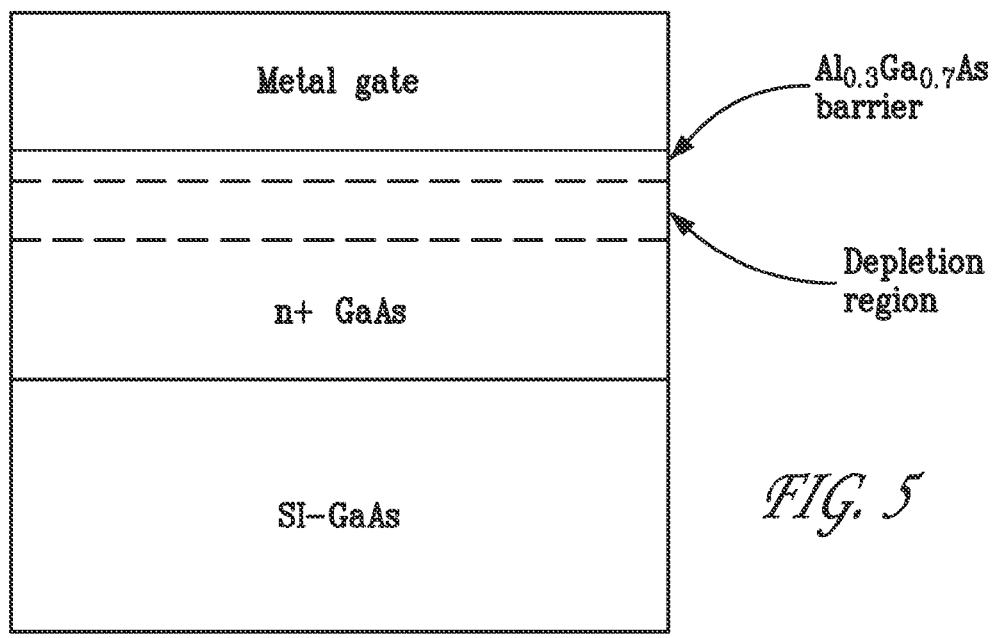
FIG. 5 provides a schematic cross-sectional view of an exemplary split-ring resonator array as described herein.

We have also performed theoretical and experimental studies of various implementations of a split ring resonator (SRR) array formed on an n+ doped GaAs layer and forming a metal-semiconductor junction therewith. FIG. 5 provides a schematic cross-sectional view of such an array, including semi-insulating GaAs substrate 30, n+ GaAs epilayer 40, and Al$_{0.3}$Ga$_{0.7}$As insulating barrier layer 50, and gold metamaterial layer 60, which also serves as an electrical gate. Depletion region 45 is also indicated in the figure. It is advantageous to include the barrier layer for reducing leakage current.

Figure 6A:
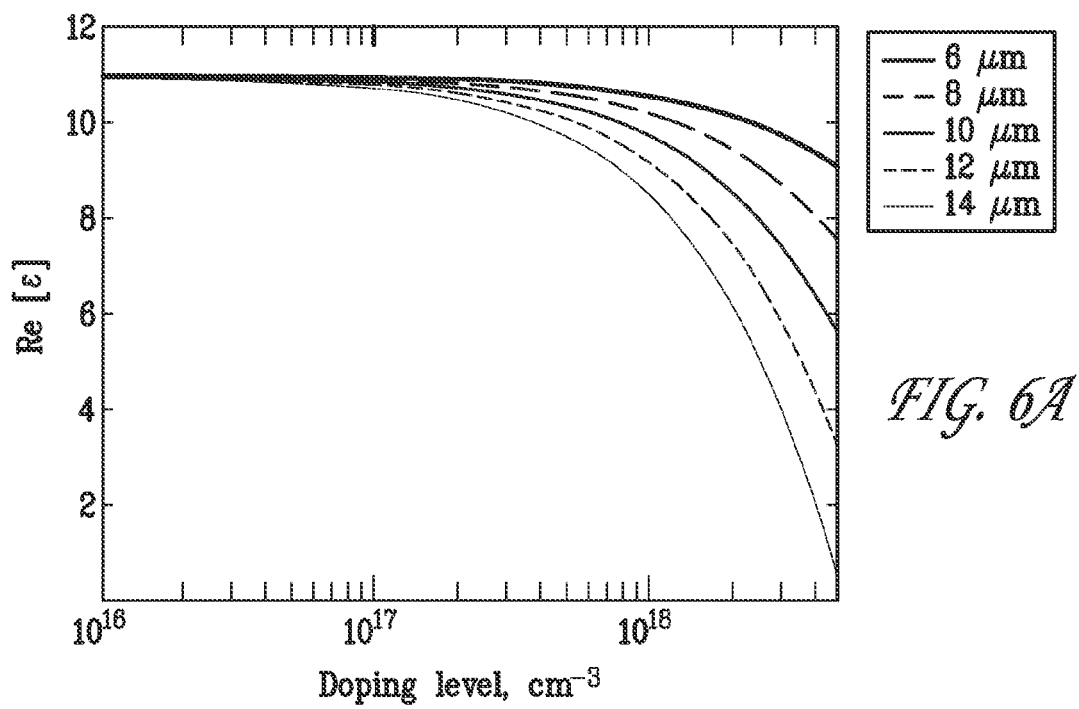
FIG. 6 provides results of theoretical calculations of the real and imaginary parts of the dielectric constant in n-doped GaAs for selected wavelengths in the range 6-14 µm.
Figure 6B:
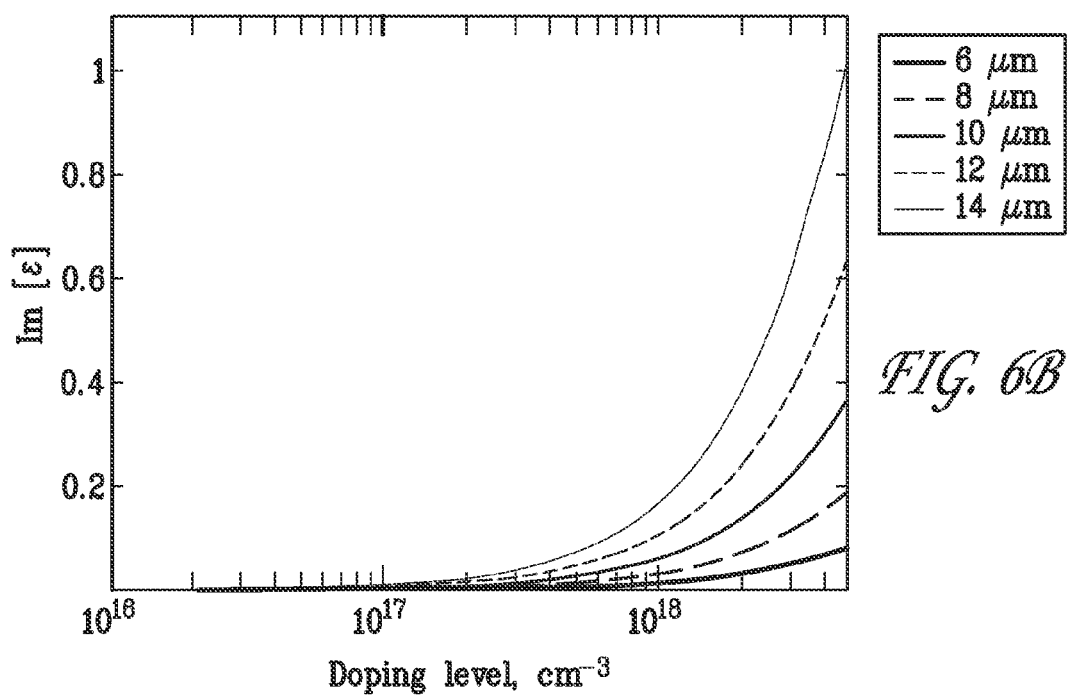

The results of our theoretical calculations of the real and imaginary parts of the dielectric constant in n-doped GaAs are shown in FIG. 6 for selected wavelengths in the range 6-14 μm. It will be seen that as the dopant concentration increases beyond a threshold of about 10$^{18}$ cm$^{-3}$, the dielectric constant decreases rapidly. We utilize this effect by providing a dopant concentration near the threshold, e.g., a concentration of 5×10$^{18}$ cm$^{-3}$. Then we apply a negative bias to increase the width of the depletion region, thereby producing a relatively large change in the dielectric constant.

For example, at the stated dopant concentration we have produced a change $\Delta \in$ in the dielectric constant of about 5.5 at a wavelength of 10 μm. As seen in the figure, the change becomes even greater for longer wavelengths. It should be noted that as also seen in the figure, the imaginary part of the dielectric constant also grows more rapidly with carrier depletion at the longer wavelengths, leading to greater optical loss.

Figure 7:
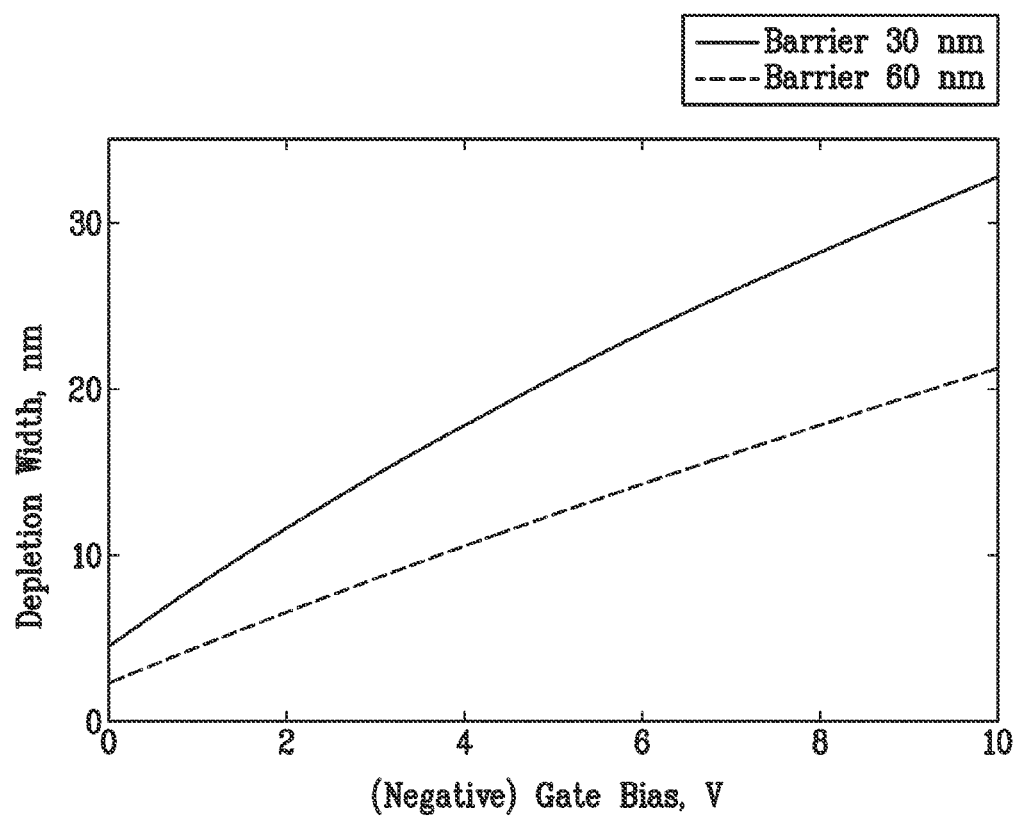
FIG. 7 provides the results of our theoretical calculation of the depletion width as a function of the bias voltage in an exemplary device as described herein.

FIG. 7 provides the results of our theoretical calculation of the depletion width as a function of the bias voltage in the arrangement as described above, at a doping level of 5×10$^{18}$ cm$^{-3}$ and using Al$_{0.3}$Ga$_{0.7}$As barrier layers of respective thicknesses 30 and 60 nm. It will be seen that applying a modest negative bias can increase the depletion width by 10 nm, 20 nm, or even more.

An analytical estimate of the depletion width, based on a well-known theory of metal-insulator-semiconductor capacitors, is $$W_{depletion} = \left[ \frac{2\varepsilon_{GaAs}\varepsilon_0}{qN_D} |-\varphi_s| \right]^{\frac{1}{2}}$$

$$V_G = \varphi_s + \varphi_{MS} - \frac{\varepsilon_{GaAs}}{\varepsilon_{AlGaAs}} W_{barrier} \left[ \frac{2qN_D}{\varepsilon_{GaAs}\varepsilon_0} |\varphi_s| \right]^{1/2}$$

In the preceding expressions, $\in_0$ is the vacuum dielectric constant, $\in_{GaAs}$=12.9 is the static dielectric constant of GaAs, $\in_{AlGaAs}$=12.05 is the static dielectric constant of Al$_{0.3}$Ga$_{0.7}$As, $V_G$ is the gate voltage, $\phi_{MS}$ is the flatband voltage, i.e., the difference between the work functions of the metal and the GaAs, W$_{barrier}$ is the barrier-layer thickness, q is the electronic charge, and N$_D$ is the donor dopant concentration.

Figure 8:
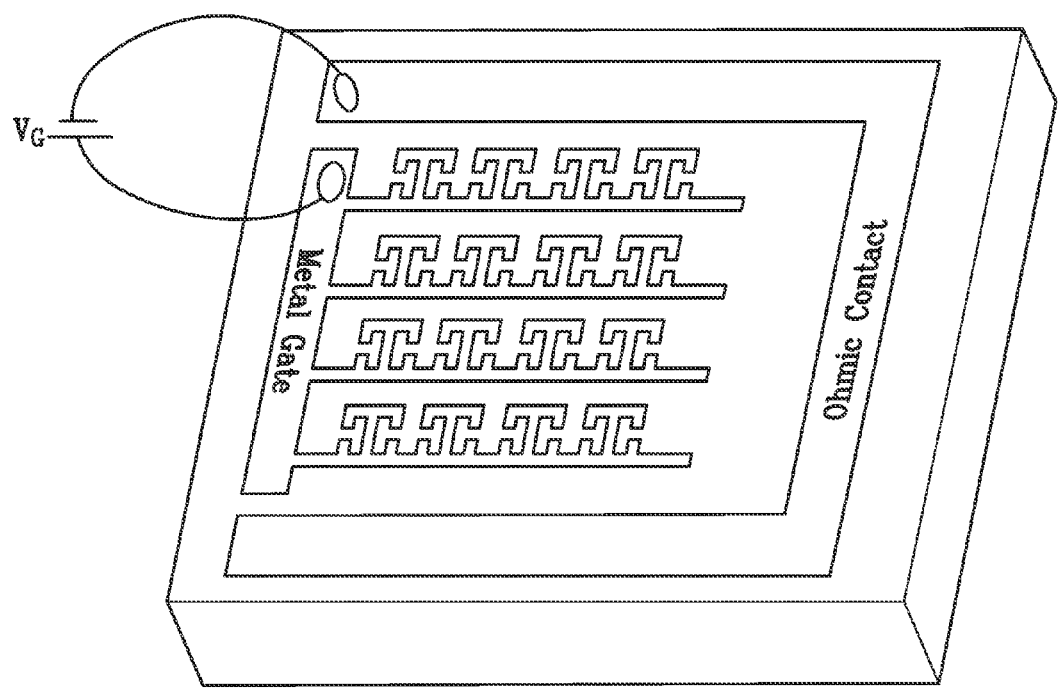
FIG. 8 provides a perspective view of one example of a fabricated device including a split ring resonator array, looking from the top. The figure also indicates, in schematic fashion, the application of a bias voltage between inner and outer contact regions.

FIG. 8 provides a perspective view of one example of a fabricated device, looking from the top. It will be seen that SRR array 70 is formed on substrate 80. Conductive traces 90 are horizontal bus lines, which connect to inner contact region 100, which functions as the gate contact. Outer contact region 110 is an ohmic contact. The figure also indicates, in schematic fashion, the application of a bias voltage between the inner and outer contact regions.

To make an exemplary device, we grew an undoped GaAs buffer layer and a 700 nm thick n+ GaAs epilayer (donor dopant concentration of $5\times10^{18}$ cm$^{-3}$) on a semi-insulating GaAs substrate by molecular beam epitaxy. We then grew a 30 nm undoped Al0.3Ga0.7As barrier layer and a 5 nm GaAs cap layer.

Metal contacts were formed by optical lithography, metal deposition, and lift-off. The outer (ohmic) contact region was formed by electron-beam deposition in the sequence Ge (26 nm)/Au (54 nm)/Ni (14 nm)/Au (150 nm) followed by rapid thermal anneal at 380° C. for 30 seconds in argon. The inner (gate) contact region was then formed by PECVD deposition of a 70-nm silicon dioxide layer to prevent current from flowing through the metal gate and to provide mechanical protection to the barrier layer, followed by electron-beam deposition in the sequence Ti (10 nm)/Au (150 nm). The bus lines were used to connect the SRR array (see below) to the gate contact region.

An SRR array having an active area measuring 1 mm×1 mm was formed by a patterning step using electron-beam lithography and by metal deposition in the sequence Ti (5 nm)/Au (60 nm). Ohmic and metal gate contacts were then wire-bonded to a chip carrier.

Figure 9:
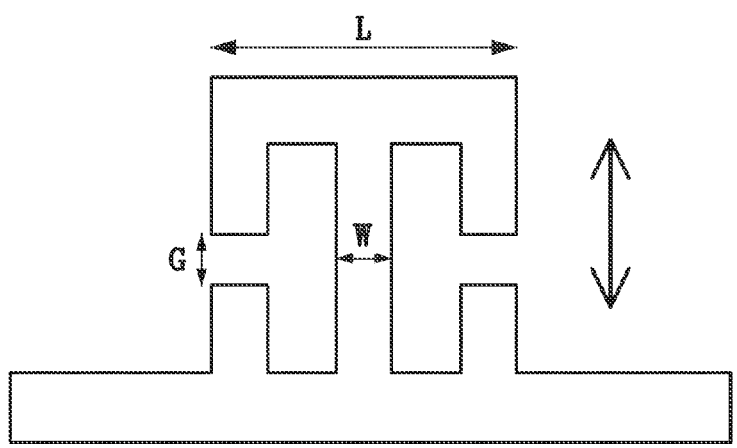
FIG. 9 provides a plan view of one example of a unit cell of a split ring resonator array. The double-headed arrow in the figure indicates the orientation of the electric field of the incident polarized light.

One example of a unit cell of the SRR is provided in plan view in FIG. 9. The dimensions, as indicated in the figure, are G=110 nm, W=130 nm, L=720 nm. The double-headed arrow in the figure indicates the orientation of the electric field of the incident polarized light.

Figure 10A:
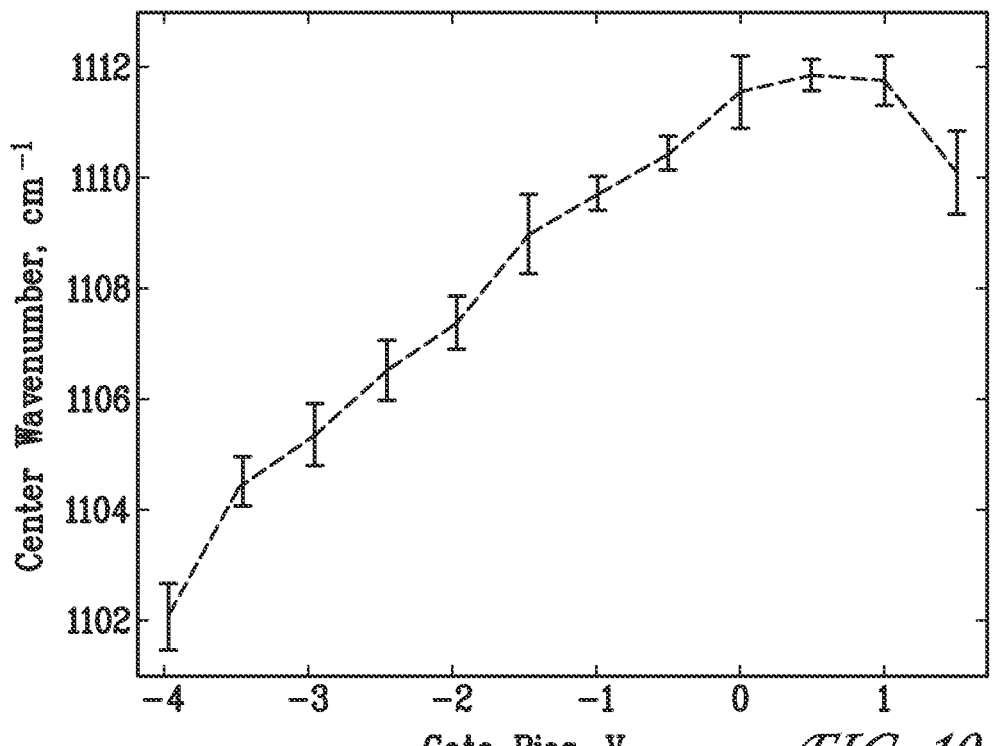
FIGS. 10A and 10B provide experimental results describing the performance of the device of FIG. 9.
Figure 10B:
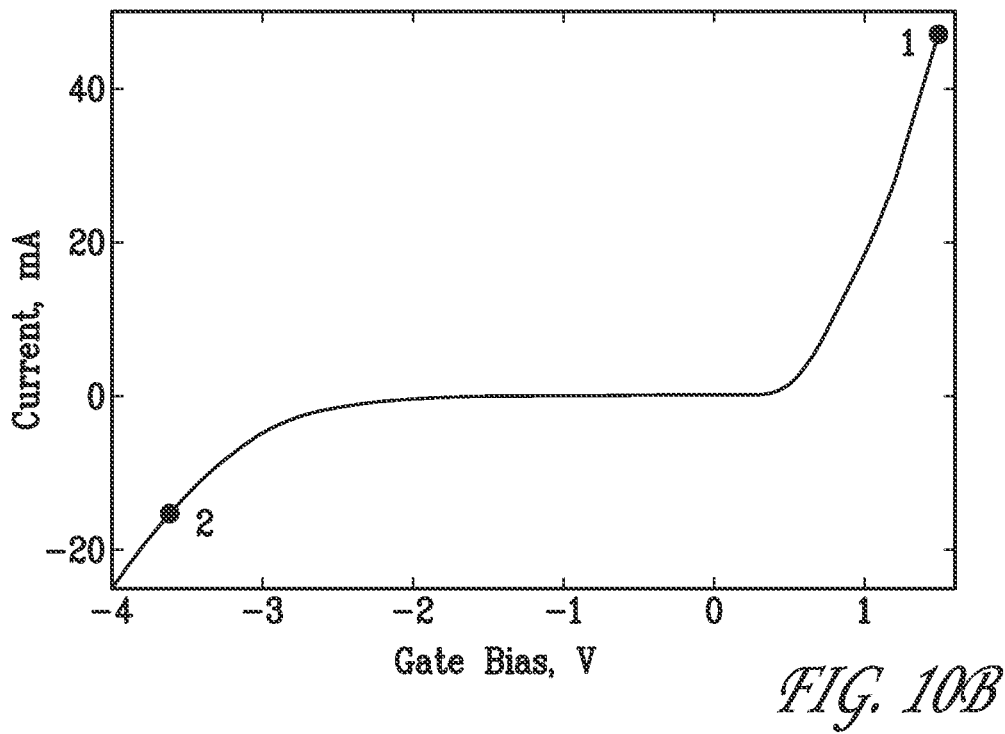

FIGS. 10A and 10B provide experimental results describing the performance of the device of FIG. 9. FIG. 10A is a graph showing how the center frequency of the resonant peak in optical transmission varies with the bias voltage. The values of the center frequencies were obtained by Gaussian curve fitting. Error bars included in the plot represent experimental statistics. FIG. 10B provides the current-voltage curve of the device.

We have provided an example of $Al_{0.3}Ga_{0.7}As$ as an insulating barrier material. This material is effective because it has a higher bandgap than the underlying layer of GaAs. However, such a material choice is merely exemplary and not limiting. For example, oxides such as $Al_2O_3$ may also be effective as barrier materials. However, our numerical simulations indicated that the tuning effect, i.e., the shift in resonance with applied bias voltage, is greater with $Al_{0.3}Ga_{0.7}As$ than with $Al_2O_3$.

We have provided an example of GaAs as an example of the semiconductor material in which the carrier density is to be varied. This choice should be understood as merely illustrative and not limiting. In particular, it may be desirable to select semiconductor materials that exhibit greater sensitivity of dielectric constant to changes in the carrier density. Generally, this is seen in semiconductors having smaller electron effective mass. InSb, for example, has an electron effective mass only 21% that of GaAs. For operation at still higher optical frequencies, it might be advantageous to employ semiconductor materials with higher carrier densities, such as indium tin oxide or aluminum-doped zinc oxide.

SRR Array Using an Asymmetric Unit Cell

Figure 11C:
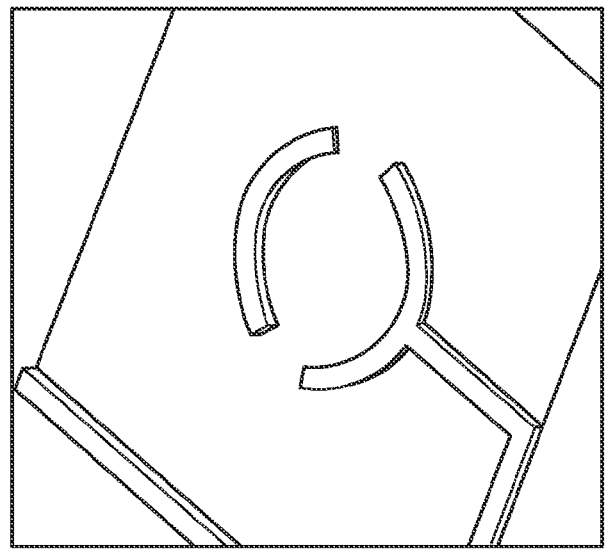
FIGS. 11A, 11B, and 11C provide further examples of a unit cell of a split ring resonator array.
Figure 11B:
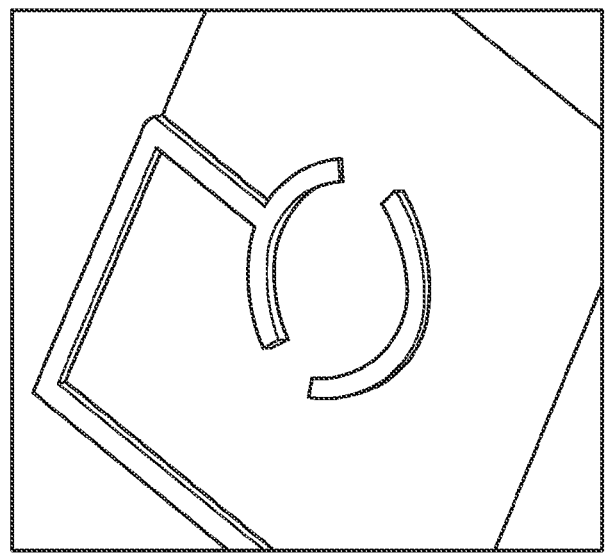
Figure 11A:
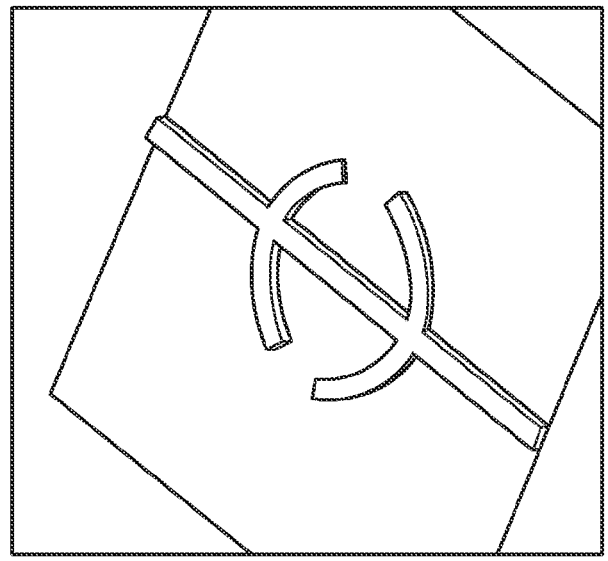
Figure 12:
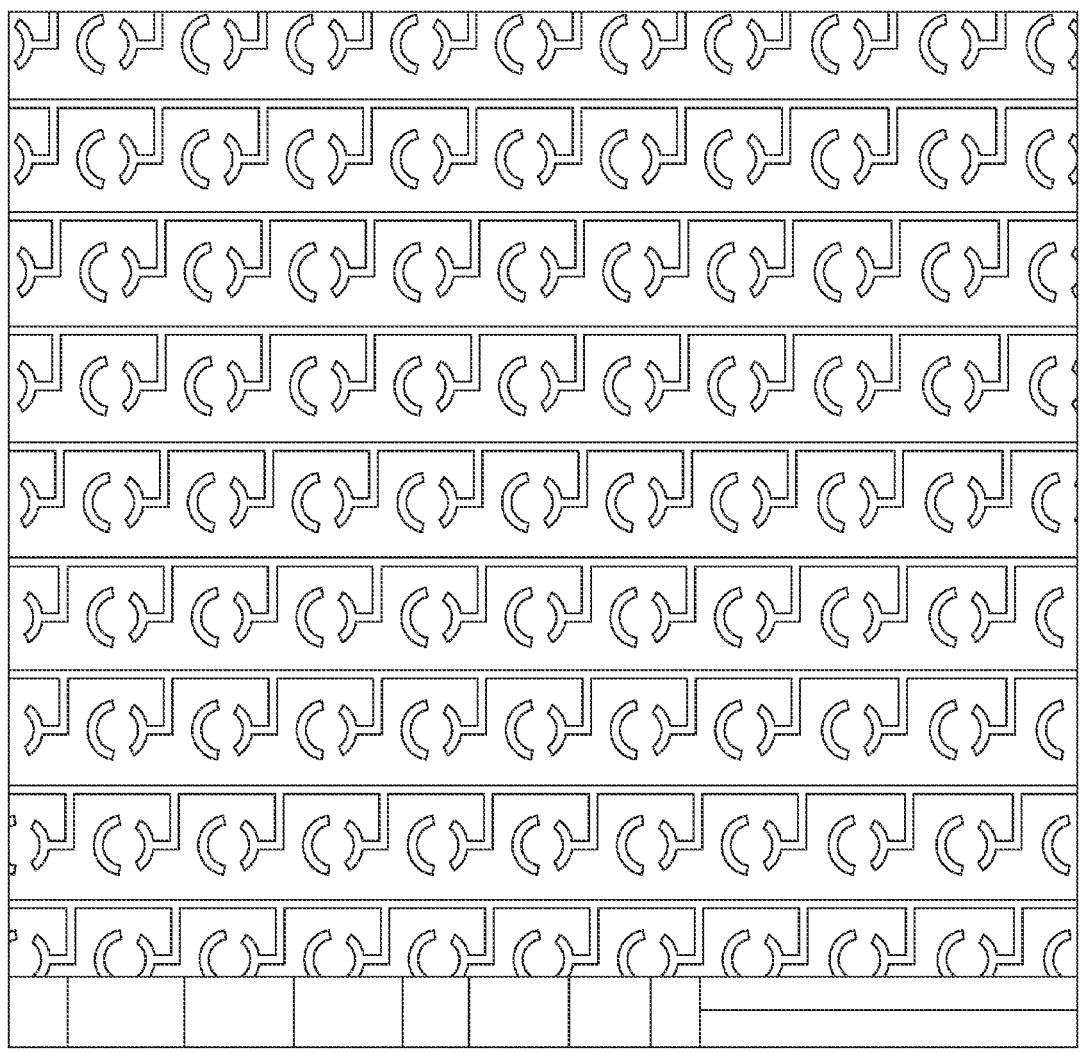
FIG. 12 provides a plan view of a repeating array of unit cells of the type shown in FIG. 11B.

Another example of a unit cell of the SRR, with variations, is provided in perspective view in FIGS. 11A, 11B, and 11C. A repeating array of unit cells of the type shown in FIG. 11B is shown in plan view in FIG. 12.

It will be seen that each unit cell includes separated arcs 120, 125 of a split ring and a portion 130 of a bus bar. As will be understood from inspection of the figure, this design is asymmetric because the respective arcs 120, 125 are unequal in length. The pattern dimensions are as follows:

Ring diameter, 770 nm; trace width, 150 nm; gap size, about 470 nm; smaller arc, 130°; larger arc, 160°; unit cell repeat distance, 4 µm.

The electric field of incident polarized light is oriented parallel to the gap between the two arcs, i.e., parallel to a diameter interposed between the two arcs.

Asymmetric structures, such as that described above, are of interest because the asymmetry can enhance the device's sensitivity to changes in the electrical permittivity of the substrate. For example, V. A. Fedotov et al., "Sharp Trapped-Mode Resonances in Planar Metamaterials with a Broken Structureal Symmetry," *Phys. Rev. Lett.* 99 (2007) 147401, reports an asymmetric SRR structure for use in the microwave range up to 14 GHz using a pair of arcuate metal arms having different lengths so as to resonate at slightly different frequencies. The two metal arms are out-of-phase within a narrow frequency range, and the transmission spectrum has a transparency window due to the destructive interference from the two resonator arms. Because this transparency window is cause by interference from two coupled resonators, it can be more sensitive to a substrate refractive index change.

Our asymmetric structure, described above, is similar to the Fedotov et al. structure, but has been adapted for use in electrically tunable mid-infrared devices. As such, it has been adapted for operation in a much higher frequency range, and in our implementations the metal array has the further function of serving as a gate electrode to modify the depletion width. More specifically, the depletion width in the underlying n-doped semiconductor epilayer changes with the electric gate bias as we have explained above. This induces a change of the permittivity of the substrate and leads to frequency tuning of the metamaterial resonance.

Figure 13A:
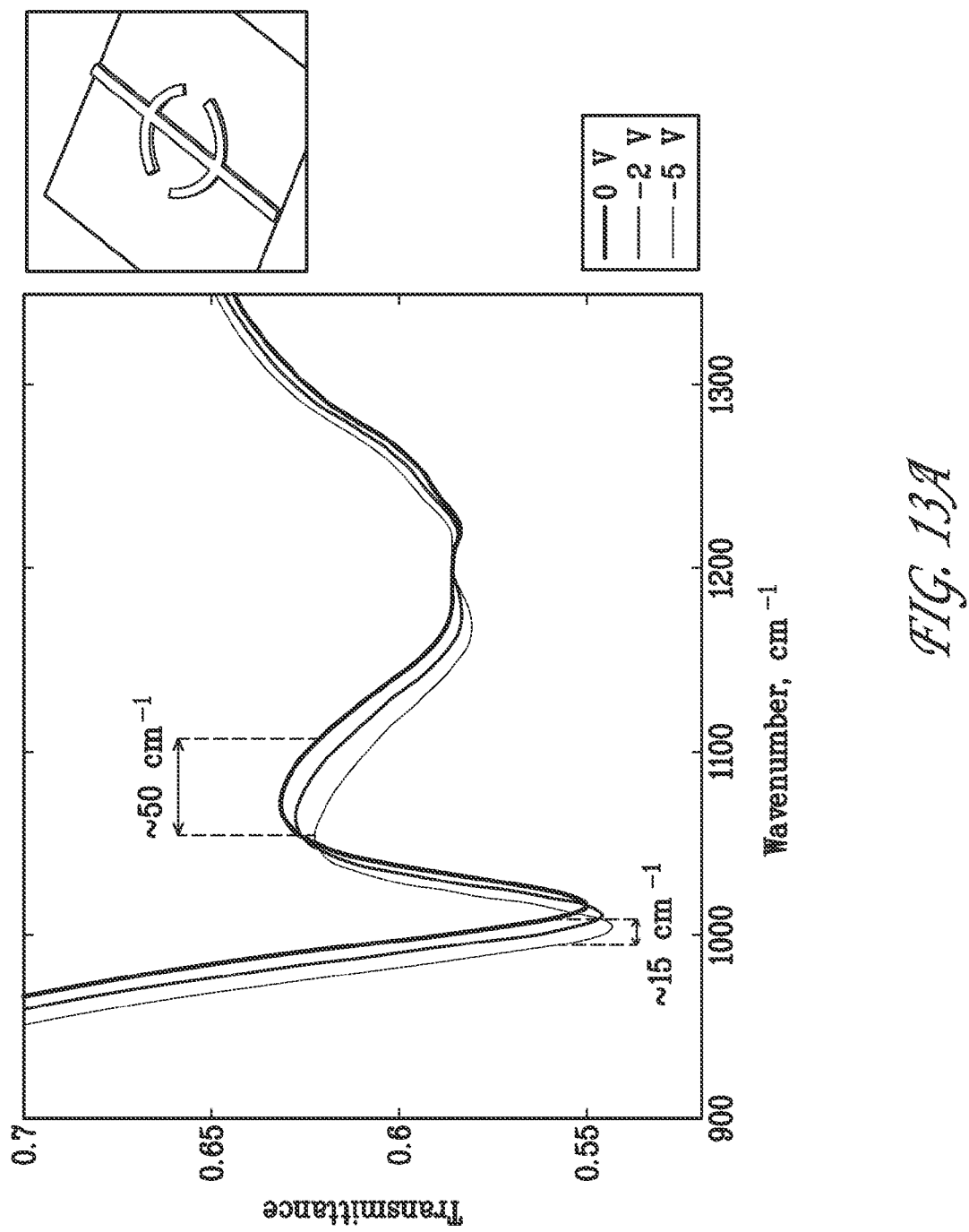
FIGS. 13A, 13B, and 13C provide theoretical transmission spectra, obtained from numerical simulations, for an asymmetric SRR device as described above, made with respectively the unit cells of FIGS. 11A, 11B, and 11C. In each figure, the transmittance is plotted versus the wavenumber for each of three bias voltages, namely 0V, -2V, and -5V. A negative sign indicates reverse bias.
Figure 13B:
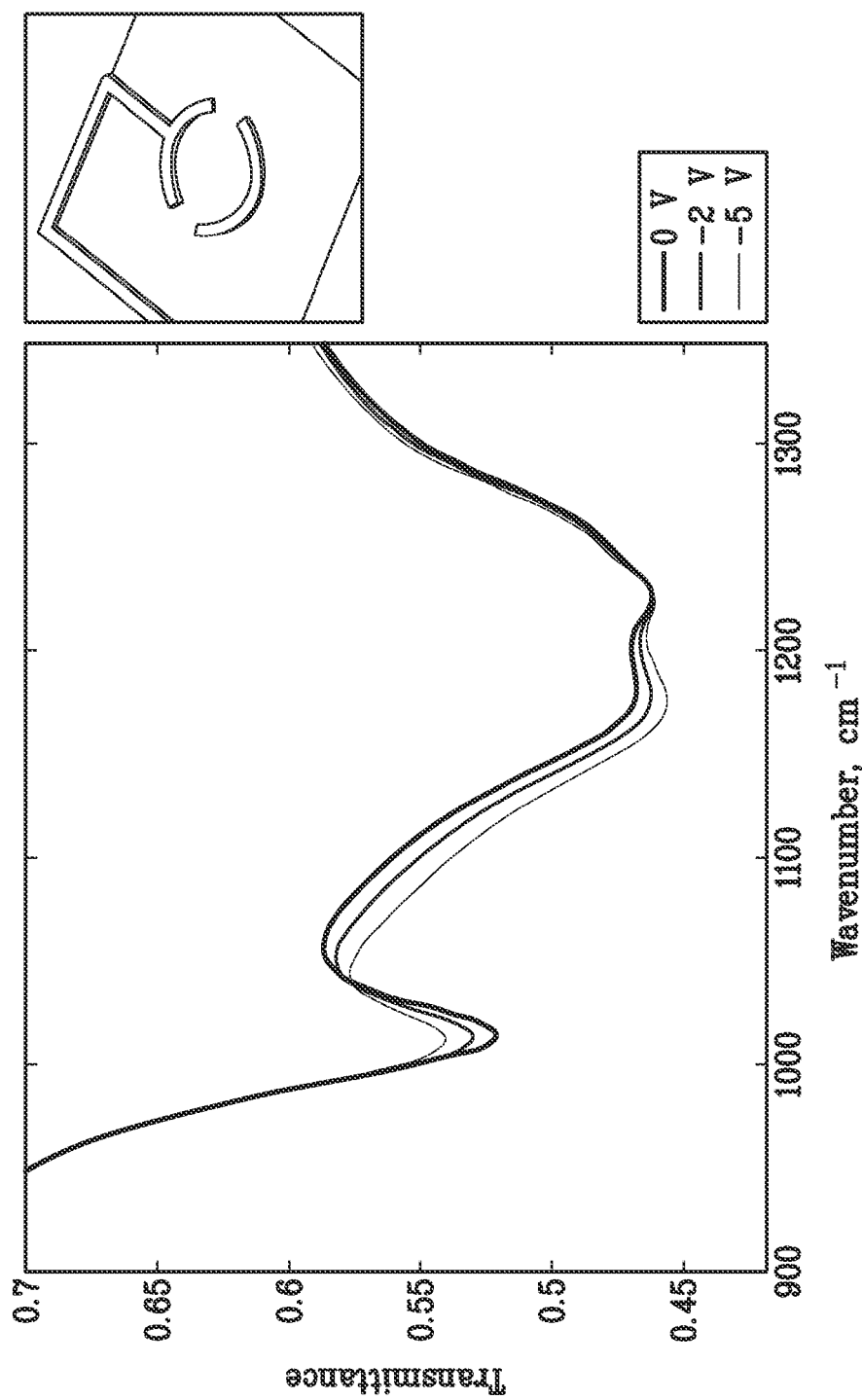
Figure 13C:
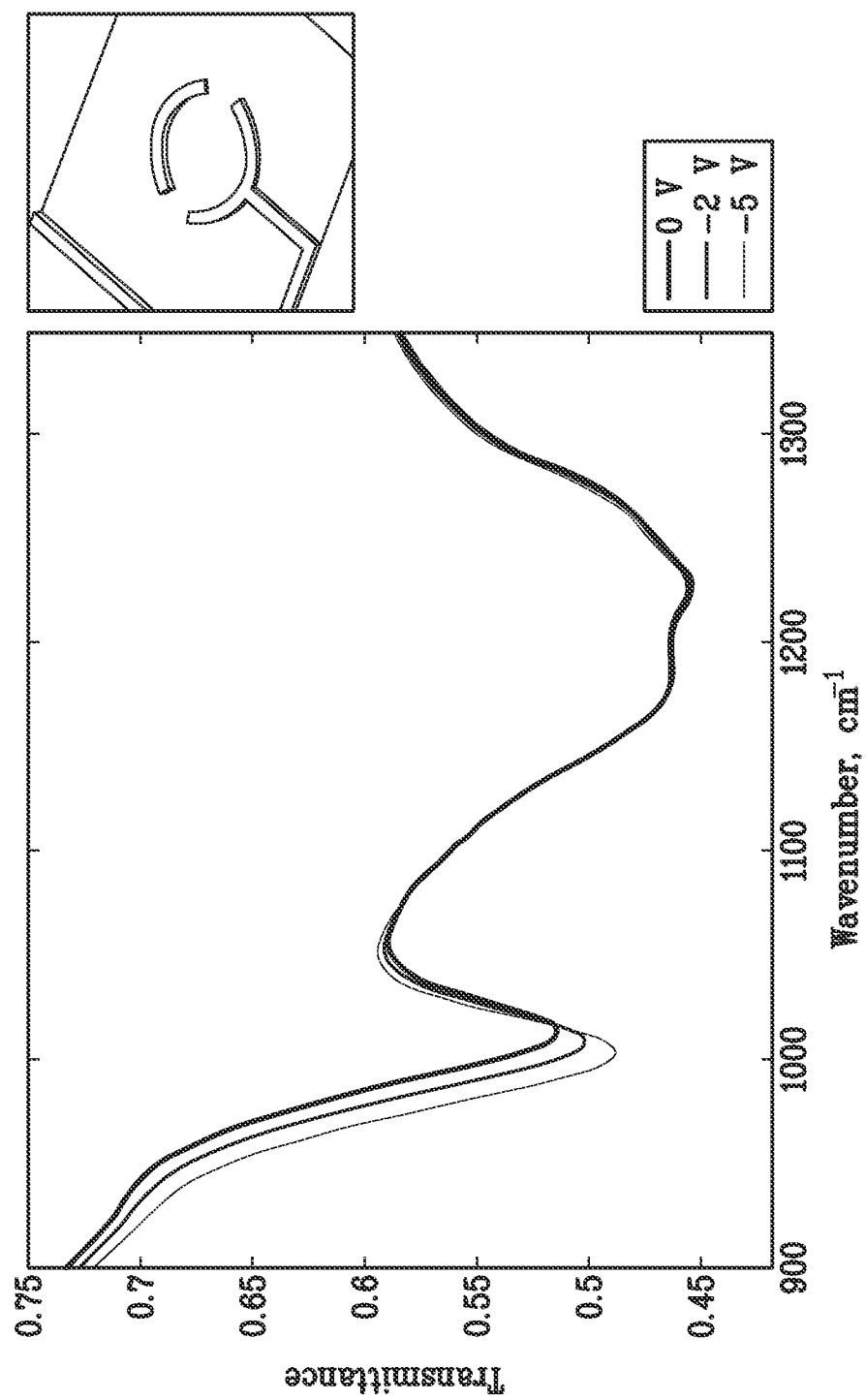

FIGS. 13A, 13B, and 13C provide theoretical transmission spectra, obtained from numerical simulations, for an asymmetric SRR device as described above, made with respectively the unit cells of FIGS. 11A, 11B, and 11C. In each figure, the transmittance is plotted versus the wavenumber for each of three bias voltages, namely 0V, −2V, and −5V. A negative sign indicates reverse bias.

It will be seen that in the structure of FIGS. 11A and 13A, both resonator arms are connected to an electrical bus line; in the structure of FIGS. 11B and 13B, only the smaller arc is connected to the electrical bus line; and in the structure of FIGS. 11C and 13C, only the larger arc is connected to the electrical bus line.

In each of the three figures, it will be seen that there are two resonances, situated at wavenumber values of approximately 1000 and 1200 cm$^{-1}$. A transparency window appears between the two resonances, which we attribute to destructive interference between the two resonances. We refer to this relatively transparent region as a "trapped mode". In FIG. 13A, representing the case in which both resonator arms are connected to the bus line, it will be seen that the tuning effect is strongest in the trapped mode region.

We also found that in the implementations in which only one resonator arm is connected to the bus line, effects attributable to localized control of the refractive index were observed. That is, the tuning behavior depended on which arm was biased.

When reverse bias is applied to a resonator arm, the refractive index in the substrate portion underlying that arm increases due to the expanded depletion region, leading to a shift in the resonance toward longer wavelengths (equivalently, lower wavenumbers). When both arms are biased, this shift is observed across both resonance regions. However, when only one arm is biased, our calculations show that the interference condition between the coupled resonators is changed, and that such a change is reflected in the spectral behavior. FIG. 13B shows that when the smaller arm is biased, the transmittance near the lower-energy resonance increases as the magnitude of the reverse bias increases. On the other hand, FIG. 13C shows that when the larger arm is biased, the transmittance near the lower-energy resonance decreases as the magnitude of the reverse bias increases.

Accordingly, it will be understood that when both arms are connected to the biasing circuit as in, e.g., FIG. 11A, the frequency-tuning effects resemble those seen in the case of a symmetric metamaterial. But when only one arm is connected (as in, e.g., FIG. 11B or FIG. 11C), we observe an amplitude-modulation effect that is more pronounced than the frequency-tuning effect. We therefore believe that the asymmetric metamaterial design is flexible enough to provide, as desired, frequency tuning, amplitude modulation, or a combination of both, depending on the biasing scheme.

It should also be noted that two separate biasing lines are readily provided, so that one electrically connects only the long arcs, whereas the other connects only the short arcs. A switch is also readily implemented, so that an operator can select among biasing schemes to produce more diverse tuning and/or modulation behavior.

It should be noted further that although our examples relate to cases in which there are only two coupled resonators, this should not be understood as limiting. Rather, more complex structures are readily contemplated in which more than two coupled resonators are employed in order to produce desired changes in the spectral behavior in response to applied bias voltages.

What is claimed is:

1. An optical device, comprising a metamaterial and a circuit adapted to apply a bias voltage to the metamaterial, wherein:
   the metamaterial comprises a doped semiconductor substrate and an array of resonators overlying the substrate;
   the array of resonators comprises a two-dimensional repeating pattern of electrically interconnected resonator units;
   each said unit is dimensioned to have at least one resonant frequency responsive to stimulation by at least one frequency of electromagnetic radiation in a range of operating frequencies at least 15 THz;
   the bias circuit is adapted to apply the bias voltage between the substrate and the array of resonators;
   the substrate has a semiconductor plasma resonance lying below the operating frequency range; and
   the array of resonators is electromagnetically coupled at least at one said resonant frequency to the substrate; and
   each resonator unit is conformed as two or more electromagnetically coupled resonator arms having different resonant frequencies.

2. The optical device of claim 1, wherein each resonator unit comprises a ring split into two unequal arcs.

3. The optical device of claim 1, wherein at least one of the arms is conductively coupled to the bias circuit and at least one of the arms is not conductively coupled to the bias circuit.

4. The optical device of claim 1, wherein the array is underlain by a resistive barrier layer.

5. The optical device of claim 4, wherein the resistive barrier layer is composed of a semiconductor material having a greater bandgap than the substrate.

6. The optical device of claim 5, wherein the substrate comprises GaAs, the resistive barrier layer comprises $Al_xGa_{1-x}As$, and x is greater than 0 but less than 1.

7. The optical device of claim 1, wherein:
   the array has relatively low transmissivity for electromagnetic radiation at the respective resonant frequencies; and
   the respective resonant frequencies are selected such that the array has relatively high transmissivity for electromagnetic radiation in a range of frequencies lying between the resonant frequencies.

8. The optical device of claim 1, wherein:
   one set of resonator arms having a common resonant frequency is electrically interconnected by direct electrical contact;
   at least one further set of resonator arms having a different common resonant frequency is electrically interconnected by direct electrical contact; and
   the bias circuit is switchable between at least the one set of resonator arms and the further set of resonator arms.

* * * * *